(12) United States Patent
Jung et al.

(10) Patent No.: US 8,264,341 B2
(45) Date of Patent: Sep. 11, 2012

(54) BROADCAST SIGNAL RETRANSMISSION SYSTEM AND METHOD USING ILLUMINATING VISIBLE-LIGHT COMMUNICATION

(75) Inventors: Hee Won Jung, Suwon-si (KR); Jong Hee Kim, Seongnam-si (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 1586 days.

(21) Appl. No.: 11/473,884

(22) Filed: Jun. 23, 2006

(65) Prior Publication Data
US 2007/0157258 A1    Jul. 5, 2007

(30) Foreign Application Priority Data
Jan. 3, 2006 (KR) .................. 10-2006-0000345

(51) Int. Cl.
*H04N 7/18* (2006.01)
(52) U.S. Cl. ............ 340/531; 725/78; 725/130; 725/80; 398/183; 398/107; 348/14.05; 348/734; 455/412.1; 455/95
(58) Field of Classification Search .............. 725/78, 725/80, 130; 398/183, 107; 348/734, 14.05; 455/412.1, 95
See application file for complete search history.

(56) References Cited

U.S. PATENT DOCUMENTS

| | | | |
|---|---|---|---|
| 5,610,916 A * | 3/1997 | Kostreski et al. | 370/487 |
| 5,646,942 A * | 7/1997 | Oliver et al. | 370/312 |
| 5,729,549 A * | 3/1998 | Kostreski et al. | 370/522 |
| 5,923,363 A * | 7/1999 | Elberbaum | 348/156 |
| 6,218,931 B1 * | 4/2001 | Asghar et al. | 370/479 |
| 6,559,765 B2 * | 5/2003 | Toyoda et al. | 340/506 |
| 6,577,080 B2 * | 6/2003 | Lys et al. | 315/362 |
| 6,597,389 B2 * | 7/2003 | Tanaka et al. | 348/14.08 |
| 6,603,842 B2 * | 8/2003 | Elberbaum | 379/106.01 |
| 6,614,126 B1 * | 9/2003 | Mitchell | 307/9.1 |
| 6,766,172 B1 * | 7/2004 | Tokuda et al. | 455/445 |
| 6,822,699 B2 * | 11/2004 | Furui | 348/778 |
| 6,940,957 B2 * | 9/2005 | Elberbaum | 379/106.01 |
| 7,269,743 B2 * | 9/2007 | Yagawa | 713/189 |
| 7,383,359 B2 * | 6/2008 | Motoyama et al. | 709/250 |
| 7,461,012 B2 * | 12/2008 | Elberbaum | 705/27.1 |
| 7,502,546 B2 * | 3/2009 | Elberbaum | 386/201 |
| 7,583,901 B2 * | 9/2009 | Nakagawa et al. | 398/183 |

(Continued)

FOREIGN PATENT DOCUMENTS
KR    2001-16590    3/2001

*Primary Examiner* — Benjamin C Lee
*Assistant Examiner* — Quang D Pham
(74) *Attorney, Agent, or Firm* — Cha & Reiter, LLC

(57) ABSTRACT

Disclosed herein are a broadcast signal retransmission system and method using illuminating visible-light communication. The broadcast signal retransmission system comprises one or more light-emitting diode (LED) lighting fixtures, one or more smart communicators, and a home server. The home server receives and demodulates a multi-channel broadcast signal and, in reply to a signal request message from a smart communicator, transmits a demodulated broadcast channel signal through a power line to an LED lighting fixture indicated by the signal request message. The LED lighting fixture converts the broadcast channel signal into a light signal. The smart communicator receives the light signal from the LED lighting fixture and decodes the light signal into a broadcast signal. As a result, the user can selectively receive a broadcast signal of a desired channel using a smart communicator via a nearby LED lighting fixture.

19 Claims, 5 Drawing Sheets

U.S. PATENT DOCUMENTS

| | | | |
|---|---|---|---|
| 7,646,727 B2* | 1/2010 | Hirota et al. | 370/252 |
| 7,675,509 B2* | 3/2010 | Champion et al. | 345/204 |
| 7,970,537 B2* | 6/2011 | Ann et al. | 701/434 |
| 8,073,304 B2* | 12/2011 | Rohlicek | 386/200 |
| 2001/0000422 A1* | 4/2001 | Sid | 315/293 |
| 2002/0093296 A1* | 7/2002 | Belliveau | 315/294 |
| 2002/0138851 A1* | 9/2002 | Lord et al. | 725/133 |
| 2002/0188952 A1* | 12/2002 | Istvan et al. | 725/95 |
| 2003/0067660 A1* | 4/2003 | Oda et al. | 359/172 |
| 2003/0102979 A1* | 6/2003 | Jednacz et al. | 340/825.52 |
| 2003/0193619 A1* | 10/2003 | Farrand | 348/731 |
| 2004/0101312 A1* | 5/2004 | Cabrera | 398/172 |
| 2004/0174851 A1* | 9/2004 | Zalitzky et al. | 370/338 |
| 2004/0213020 A1* | 10/2004 | Gotfried | 362/576 |
| 2004/0215816 A1* | 10/2004 | Hayes et al. | 709/238 |
| 2004/0268386 A1* | 12/2004 | Logan et al. | 725/34 |
| 2005/0015805 A1* | 1/2005 | Iwamura | 725/79 |
| 2005/0015812 A1* | 1/2005 | Banet et al. | 725/126 |
| 2005/0060750 A1* | 3/2005 | Oka et al. | 725/80 |
| 2006/0044652 A1* | 3/2006 | Yamamoto | 359/601 |
| 2006/0090190 A1* | 4/2006 | Seo | 725/151 |
| 2007/0035382 A1* | 2/2007 | Lee et al. | 340/10.1 |
| 2009/0171571 A1* | 7/2009 | Son et al. | 701/208 |

* cited by examiner

BROADCAST SIGNAL RETRANSMISSION SYSTEM AND METHOD USING ILLUMINATING VISIBLE-LIGHT COMMUNICATION

CLAIM OF PRIORITY

This application claims priority, pursuant to 35 USC 119, to that patent application entitled "Broadcast Signal Retransmission System And Method Using Illuminating Visible-Light Communication," filed in the Korean Intellectual Property Office on Jan. 3, 2006 and assigned Serial No. 2006-0000345, the contents of which are incorporated herein by reference.

BACKGROUND OF THE INVENTION

1. Field of the Invention

The present invention relates generally to a broadcast signal retransmission system and method and, more particularly, to using illuminating visible-light communication system, wherein individual broadcast signals of available channels from a received multi-channel broadcast signal are transmitted using illuminating visible-light communication over power lines.

2. Description of the Related Art

In recent years, radio communication systems have come into widespread use with the popularization of portable terminals. Owing to a shortage of available frequency resources, infrared communication systems using infrared rays, which have wavelengths shorter than those of radio waves, have been actively developed. However, in addition to the shortage of frequency resources, it has been confirmed that radio waves have detrimental influence on various medical or precision instruments. Infrared rays may also be detrimental to the human body in particular circumstances. In safety aspects of communication, visible-light communication systems attract much attention.

Development of blue light-emitting diodes (LEDs) has enabled realization of white LEDs. Compared with an incandescent lamp or fluorescent lamp, a white LED consumes much less power, is smaller, and has a longer lifetime. Research efforts are ongoing to transmit signals using white LEDs by controlling on/off operations or the light amount of the white LEDs.

Active research is taking place to integrate a signal transmission function of white LEDs with a power line communication (PLC) system. Such an integrated communication system utilizing visible light is not detrimental to the human body, enables safe communication, and is expected to provide worthwhile applications.

FIG. 1 is a block diagram showing a conventional broadcast signal retransmission system.

As shown in FIG. 1, the broadcast signal retransmission system comprises an information source 10, a power line modem 12, outlets 14 and 16 interconnected by a power line, an LED lighting fixture 20, and a light-receiving terminal 30.

The information source 10 is an information output apparatus providing various kinds of information, and may be a computer or a device composed of a tuner and receiver for television, cable television and radio broadcasting. Hence, broadcast information may be a video, audio, voice, still image, character data and others.

The power line modem 12 modulates information from the information source 10 and superimposes the modulated information on a power wave carried on the power line interconnecting the outlets 14 and 16 to transmit the modulated information through the power line. Although an ordinary PLC system includes a demodulating means to support two-way communication, the broadcast signal retransmission system is one-way and does not include a demodulating means. Frequency division multiplexing may be used for multiplexing information. The power line may be an indoor or outdoor electric power transmission line.

The LED lighting fixture 20 is connected to the power line, and illuminates the vicinity thereof. The LED lighting fixture 20 may be installed at the indoor ceiling of a house and may be used for various types of illumination including spot illumination.

The LED lighting fixture 20 includes an AC/DC converter 22, a band pass filter (BPF) 24, a coupler 26, and a plurality of LEDs 28. Because DC power is needed to drive the LEDs 28 to emit light, the AC/DC converter 22 converts AC power from the power line into DC power. The AC/DC converter 22 adjusts the voltage level of the DC power according to an operating voltage of the LEDs 28, and supplies operating power to the BPF 24.

The BPF 24 acts to extract an information signal superimposed on the power line, and may selectively extract a single information signal from multiple information signals.

The coupler 26 couples the information signal extracted by the BPF 24 to the wave of the DC power converted by the AC/DC converter 22. Hence, the level of the voltage fed to the LEDs 28 can be changed according to the information signal, thereby making it possible to control the amount of light of the LEDs 28 and an on/off operation thereof. For example, the power from the AC/DC converter 22 can be controlled by the information signal from the BPF 24 to turn on and off the LEDs 28.

The LEDs 28 are primarily light sources for illumination, and may be white LEDs or a combination of red, green and blue LEDs. The LEDs 28 are driven by the power from the coupler 26 to emit light. Because LED(s) 28 has a fast response time, the amount of light of LED(s) 28 or the on/off operation thereof can be controlled by an information signal, enabling transmission of the information signal in the form of light produced by the LED 28 or LEDs (e.g., combination of red, green and blue).

The light-receiving terminal 30 includes a light-receiving means to receive light emitted from the LED lighting fixture 20, and extracts an information signal from the received light and demodulates the extracted information signal to produce desired information. The light-receiving terminal 30 may be any appliance having a light-receiving means, such as a personal computer, portable terminal, mobile phone, audio instrument or television set.

However, in the conventional broadcast retransmission system, the broadcast signal transmitted through the power line from the information source 10 is a single channel signal; therefore identical information is distributed along available power lines. Consequently, users have no choice but to receive the same information retransmitted by the retransmission system through the light-receiving terminals 30. That is, a user cannot selectively receive a retransmitted broadcast signal of a desired channel according to the user's taste.

SUMMARY OF THE INVENTION

The present invention has been made in view of the above problems and provides additional advantages, by providing a broadcast signal retransmission system and method using illuminating visible-light communication, wherein two or more broadcast channel signals are selectively transmitted along different transmission paths.

Another aspect of the present invention is to provide a broadcast signal retransmission system and method using illuminating visible-light communication wherein a broadcast channel signal is selectively switched and transmitted to a desired location according to a user request.

In one embodiment, there is provided a broadcast signal retransmission system using illuminating visible-light communication, comprising at least one light-emitting diode (LED) lighting fixtures, which converts a broadcast channel signal received through a power line into a light signal and outputs the converted light signal as illumination light, at least one smart communicator, which performs a request message transmit operation for a desired channel, and decodes illumination light from a corresponding LED lighting fixture into a reply broadcast signal and outputs the reply broadcast signal and a home server for receiving a multi-channel broadcast signal, and for, upon reception of a channel signal request message containing a desired channel index and location reference from a particular smart communicator, setting a signal switching path on the basis of the location reference and transmitting a broadcast channel signal of the requested channel through a power line connected with the signal switching path to an LED lighting fixture installed at the site indicated by the location reference.

Preferably, the smart communicator comprises a short-range communication module for connecting to the home server to perform a signal request message transmit operation, a light-receiving section for receiving illumination light from a corresponding LED lighting fixture, a broadcast signal decoder for decoding the received illumination light into a reply broadcast signal and a user interface for outputting the decoded reply broadcast signal.

Preferably, the user interface includes at least one of a display section for displaying a video part of the decoded reply broadcast signal and an audio processor for outputting an audio part of the decoded reply broadcast signal.

Preferably, the smart communicator further comprises a key interface for inputting a channel signal request containing a location reference.

Preferably, the smart communicator further comprises a memory section for storing a reply broadcast signal transmitted from the home server and channel information of the reply broadcast signal.

The home server may comprise a communication module for signal request message reception from the smart communicators, a radio frequency (RF) coupler for outputting the received multi-channel broadcast signal to one or more output lines, one or more RF tuners, each of which tunes to a multi-channel broadcast signal from the RF coupler to detect a broadcast channel signal of an available channel according to an input command, at least one demodulator for demodulating the broadcast channel signals from the related RF tuners, a switching section for setting, according to the channel signal request message containing a desired channel index and location reference, a signal switching path to route a selected one of the broadcast channel signals demodulated by the demodulators and a power line modem for superimposing the selected broadcast channel signal routed along the signal switching path on a power wave carried on a power line to transmit the broadcast channel signal through the power line.

The home server may further comprise a channel information detector for detecting channel information from the demodulated broadcast channel signals, and a path controller for controlling a switching path setting operation of the switching section using the detected channel information.

In another embodiment, there is provided a broadcast signal retransmission method using illuminating visible-light communication, comprising the steps of: a) receiving a multi-channel broadcast signal, and demodulating the received multi-channel broadcast signal into broadcast channel signals by available channels, b) receiving a channel signal request message containing a desired channel index and location reference from a smart communicator, c) setting, according to the received channel signal request message, a signal switching path to route a selected one of the broadcast channel signals and d) superimposing the selected broadcast channel signal of the requested channel on a power wave carried on a power line connected to the signal switching path, and transmitting the broadcast channel signal through the power line to an LED lighting fixture installed at the site indicated by the location reference.

The broadcast signal retransmission method may further comprise the steps of: e) converting, on reception of the broadcast channel signal by the LED lighting fixture, the broadcast channel signal into illumination light and outputting the converted illumination light, and f) receiving, by the smart communicator, the outputted illumination light, and decoding the received illumination light into a reply broadcast signal to output the decoded reply broadcast signal.

The broadcast signal retransmission method may further comprise the step of: g) detecting channel information from the demodulated broadcast channel signals, and wherein, at the step c), the signal switching path is set through identifying the requested channel and detecting the broadcast channel signal of the requested channel, using the detected channel information.

Preferably, the step a) includes the steps of receiving the multi-channel broadcast signal to output the received multi-channel broadcast signal to one or more output lines, tuning to the multi-channel broadcast signal to detect the broadcast channel signals of the available channels, and demodulating the detected broadcast channel signals.

In a feature of the present invention, broadcast channel signals extracted from a received multi-channel broadcast signal can be routed along different signal paths. In response to a signal transfer request for a desired channel from a particular site, a selected broadcast channel signal is switched between the signal paths and transmitted via a power line leading to an LED lighting fixture installed at the particular site, and outputted through the LED lighting fixture. As a result, the user at a current location can selectively receive a desired broadcast channel signal through a nearby LED lighting fixture.

DETAILED DESCRIPTION OF THE INVENTION

Figure 1:
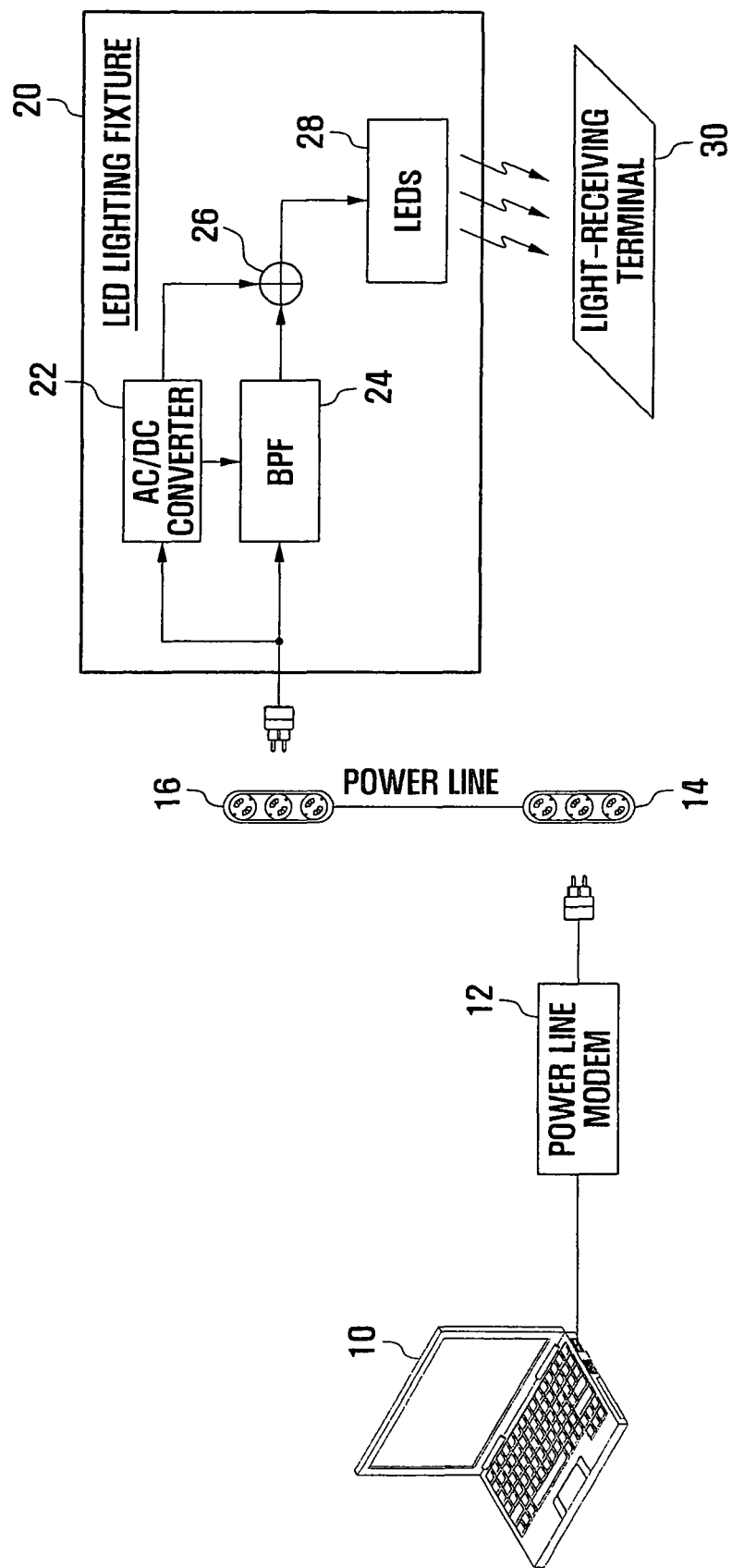
FIG. 1 is a block diagram showing a conventional broadcast signal retransmission system.

Hereinafter, embodiments of the present invention are described in detail with reference to the accompanying drawings. The same reference symbols identify the same or corresponding elements in the drawings. For the purposes of clarity and simplicity, some constructions or processes known in the art are not described to avoid obscuring the invention with unnecessary detail.

Figure 2:
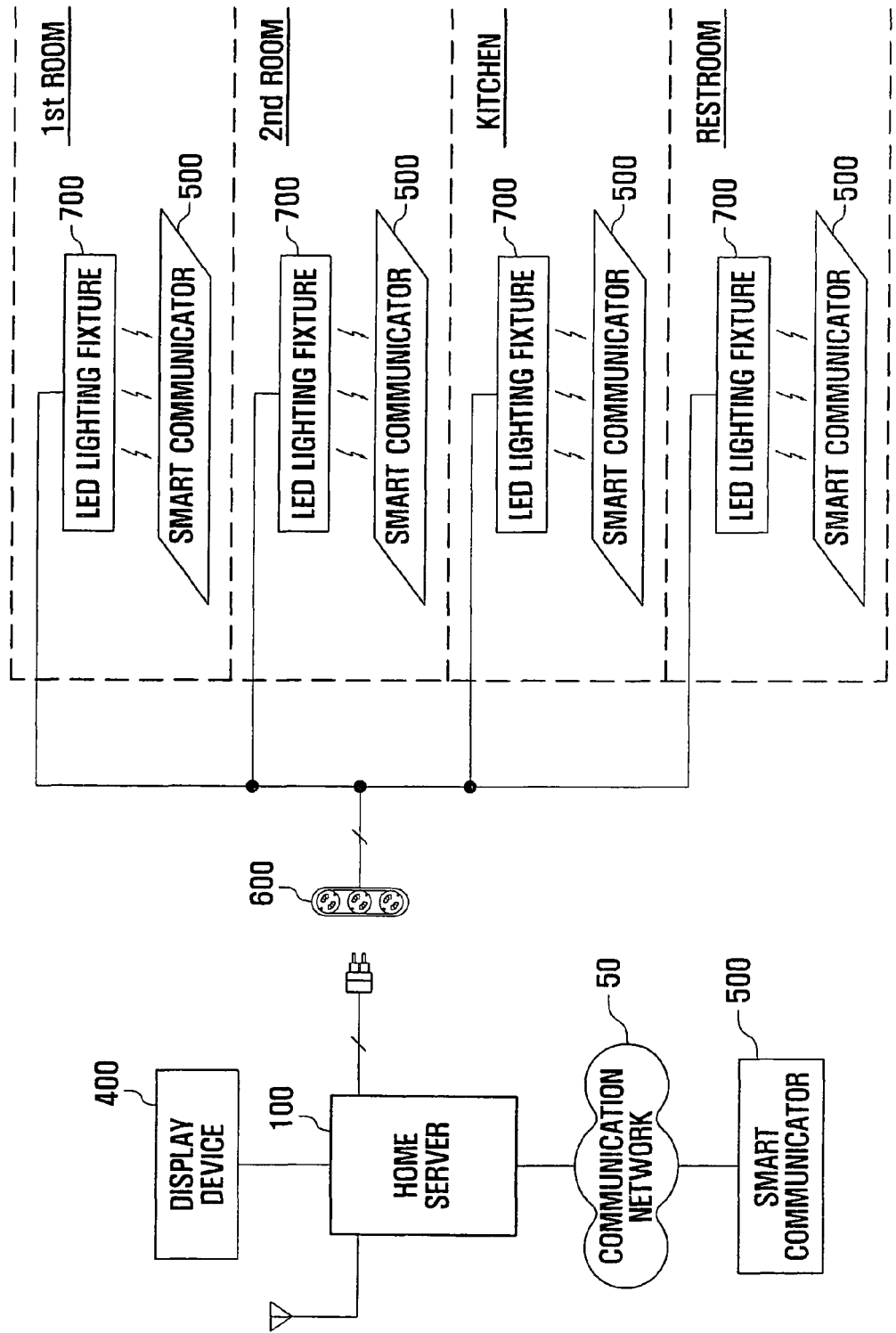
FIG. 2 is a block diagram showing a broadcast signal retransmission system using illuminating visible-light communication according to an embodiment of the present invention.

FIG. 2 shows the configuration of a broadcast signal retransmission system using illuminating visible-light communication according to an embodiment of the present invention.

As shown in FIG. 2, the broadcast signal retransmission system comprises a home server 100, a display device 400, one or more smart communicators 500 connectable for communication to the home server 100, and one or more LED lighting fixtures 700 installed at different locations.

The home server 100 controls operations of home-networked electronic appliances, and performs a required operation in response to a control command from a smart communicator 500. Additionally, in the present embodiment, the home server 100 receives a multi-channel broadcast signal via a receive antenna, detects broadcast channel signals of available channels in the received multi-channel broadcast signal using tuners, and decodes the detected broadcast channel signals. In the event of a channel signal request for a desired channel, the home server 100 transmits a selected one of the decoded broadcast channel signals through a power line to an LED lighting fixture 700 installed at a location indicated by the channel signal request. To this end, the home server 100 switches the selected broadcast channel signal between transmission paths, converts the format of the selected broadcast channel signal into a format transferable through power lines, and transmits the format-converted broadcast channel signal through a power line leading to a destination.

The display device 400 is connected to the home server 100, and represents a display appliance such as a television set to display a broadcast signal received by the home server 100.

The smart communicator 500 is an information appliance that can remotely control and monitor the home-networked electronic appliances through the home server 100 in real time and support not only voice and image communication but also portable Internet access. To this end, the smart communicator 500 includes a platform for supporting wireless broadband (WiBro), ZigBee, radio frequency identification (RFID) and global positioning system (GPS), and a user interface for controlling the home-networked electronic appliances. In the home, the smart communicator 500 controls the home server 100 through short-range communication utilizing, for example, infrared rays. From outside the home environment, the smart communicator 500 sends a control command, voice data and image data to the home server 100 through long-range Internet communication using, for example, WiBro over the communication network 50.

Additionally, in the present embodiment, the smart communicator 500 controls broadcast-signal reception of the home server 100, and broadcast-signal retransmission by demanding the home server 100 to transmit a desired broadcast channel signal to an LED lighting fixture 700 near to the smart communicator 500.

The LED lighting fixtures 700 are located at different sites. Each LED lighting fixture 700 receives a broadcast channel signal via an associated power line from the home server 100, converts the received broadcast channel signal into a light signal, and outputs the light signal.

Each smart communicator 500 further includes a light-receiving means for receiving light emitted from a nearby LED lighting fixture 700. The smart communicator 500 receives the emitted light, extracts a broadcast channel signal from the received light, and demodulates the extracted broadcast channel signal to output broadcast information of a requested channel.

To this end, the smart communicator 500 residing at a site (for example a first room, second room, kitchen or rest room) sends a channel signal request message containing a desired channel index and location reference to the home server 100 through short-range wireless communication. In return, the home server 100 switches the corresponding broadcast channel signal in the received multi-channel broadcast signal to a power line leading to the LED lighting fixture 700 installed at the site where the smart communicator 500 is currently present. The smart communicator 500 then receives a light signal emitted from the LED lighting fixture 700, extracts a broadcast channel signal from the received light signal, and demodulates the extracted broadcast signal to output desired information of the requested channel.

Figure 3:
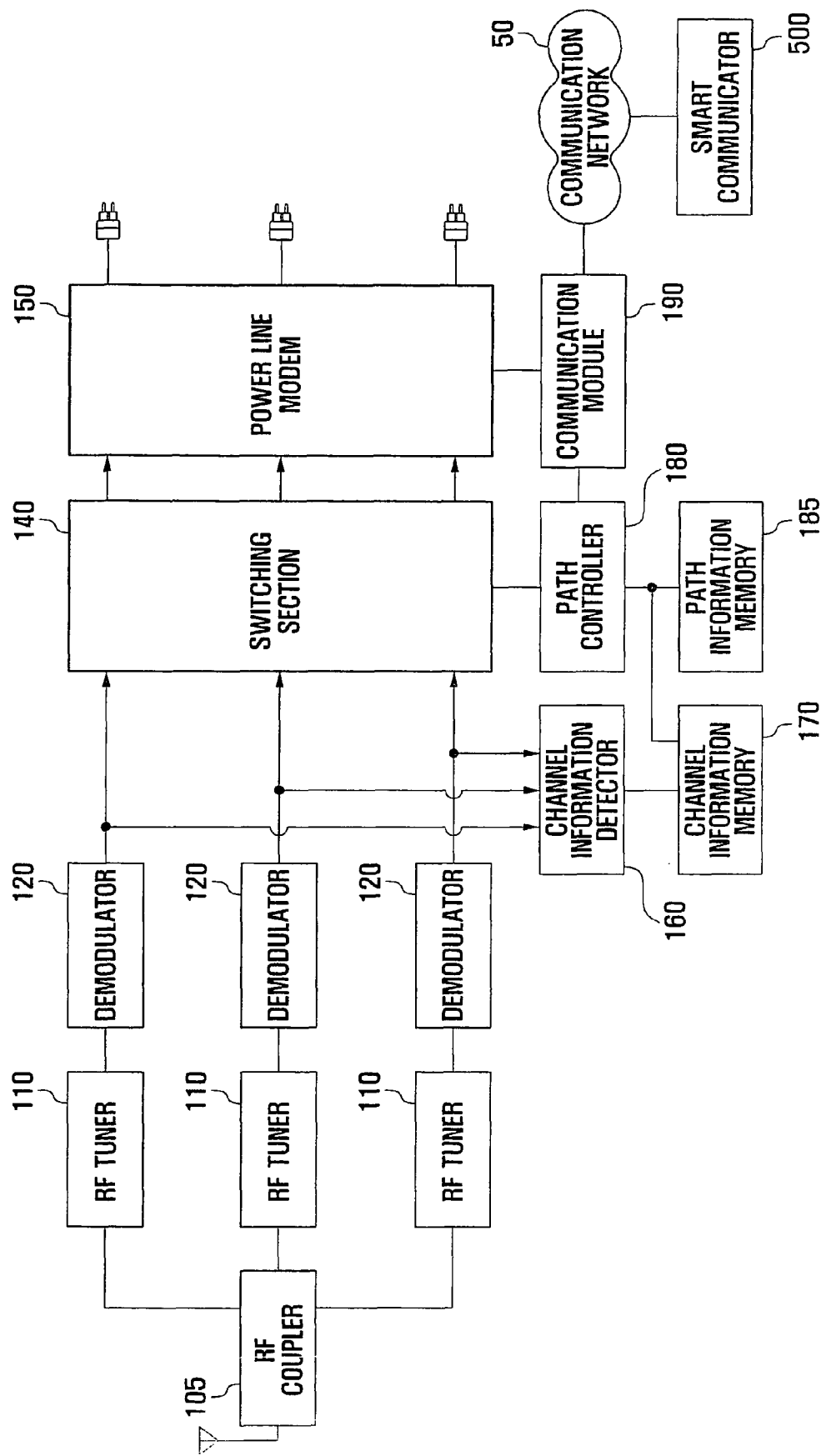
FIG. 3 is a block diagram showing the configuration of a home server in FIG. 2.

FIG. 3 is a block diagram showing a configuration of the home server 100 in FIG. 2.

As shown in FIG. 3, the home server 100 comprises a radio frequency (RF) coupler 105 for outputting a multi-channel broadcast signal received by an antenna to one or more output lines, one or more RF tuners 110 for tuning to the multi-channel broadcast signal from the RF coupler 105 to detect broadcast channel signals of available channels, one or more demodulators 120 for demodulating the extracted broadcast channel signals from the associated RF tuners 110, a switching section 140 for switching the demodulated broadcast channel signals between signal switching paths according to inputted commands, and a power line modem 150 for superimposing the broadcast channel signals on power waves carried on power lines to transmit the broadcast channel signals through the power lines.

The home server 100 further comprises a channel information detector 160 for detecting channel information of the demodulated broadcast channel signals from the demodulators 120, a channel information memory 170 for storing the detected channel information, a path controller 180 for controlling the switching section 140 to set the signal switching paths for routing the broadcast channel signals from the demodulators 120, a path information memory 185 for storing path information regarding the power lines leading from the home server 100 to the individual LED lighting fixtures 700, and a communication module 190 for connecting to the individual smart communicators 500 via the communication network 50 to perform communication operations.

Upon reception of a channel signal request message containing a desired channel index and location reference from a smart communicator 500, the path controller 180 selects a power-line path leading to the LED lighting fixture 700 indicated by the location reference from the path information stored in the path information memory 185, and controls the switching section 140 to route the requested broadcast channel signal to the LED lighting fixture 700 (see FIG. 2) through the selected power-line path. The requested broadcast channel signal is superimposed by the power line modem 150 on a power wave carried on a power line corresponding to the power-line path, and transmitted through the power line to the LED lighting fixture 700.

Although, in the present embodiment, broadcast channel signals are obtained using a combined structure of a single antenna receiving a multi-channel broadcast signal, the RF coupler 105 outputting the received multi-channel broadcast signal to multiple output lines, and the RF tuners 110 detecting individual broadcast signals of available channels, they may also be obtained using a combined structure of a plurality of antennas and a plurality of corresponding RF tuners.

Figure 4:
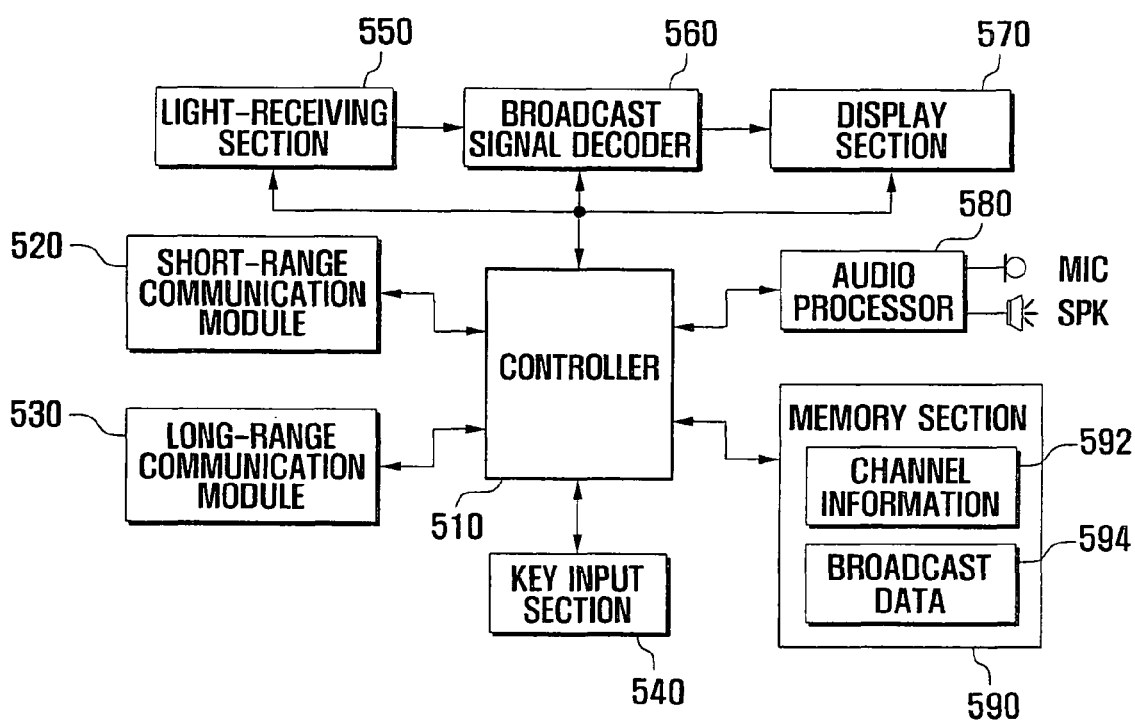
FIG. 4 is a block diagram showing the configuration of a smart communicator in FIG. 2.

FIG. 4 is a block diagram showing the configuration of a smart communicator 500 in FIG. 2.

As shown in FIG. 4, the smart communicator 500 comprises a controller 510, a short-range communication module 520, a long-range communication module 530, a key input section 540, a light-receiving section 550, a broadcast signal decoder 560, a display section 570, an audio processor 580, and a memory section 590.

The controller 510 controls the overall operation of the smart communicator 500. In the present embodiment, the controller 510 also controls the smart communicator 500 to connect to the home server 100 through the communication network 50 (see FIG. 2) for transmission of a channel signal request message containing a desired channel index and location reference of the smart communicator 500. In addition, the controller 510 controls regeneration of the requested broadcast channel signal from a light signal emitted by a corresponding LED lighting fixture 700 (see FIG. 2) indicated by the location reference.

The short-range communication module 520 provides a capability of short-range wireless communication using, for example, infrared rays to control the operation of the home server 100 in the home. In the present embodiment, the short-range communication module 520 transmits a channel signal request message containing a desired channel index and location reference of the smart communicator 500 to the home server 100.

Outside the home, the long-range communication module 530 provides a capability of a wireless Internet access to the home server 100 using, for example, the WiBro technology via the communication network 50.

The key input section 540 includes keys for inputting commands to control operations of the smart communicator 500 through the controller 510 and to remotely control operations of the home server 100 in or outside the home. In the present embodiment, the key input section 540 also includes keys for inputting a channel signal request containing a desired channel index and location reference of the smart communicator 500 to be transmitted to the home server 100.

The light-receiving section 550 receives a light signal from the corresponding LED lighting fixture 700.

The broadcast signal decoder 560 decodes the light signal received by the light-receiving section 550 into a broadcast channel signal. The display section 570 displays status information on operations of the smart communicator 500. In the present embodiment, the display section 570 also displays a video part of the decoded broadcast channel signal. For a voice communication capability of the smart communicator 500, under the control of the controller 510, the audio processor 580 converts an analog audio signal from a microphone MIC into a digital signal, and converts a digital audio signal from the controller 510 into an analog signal and outputs the analog signal through a speaker SPK. In the present embodiment, the audio processor 580 also outputs an audio part of the decoded broadcast channel signal.

The memory section 590 stores executable programs needed to operate the smart communicator 500, and may also store operation setting information of the home server 100. In the present embodiment, the memory section 590 also stores channel information 592 regarding broadcast channels available from the home server 100, and broadcast data 594 received from the home server 100.

Figure 5:
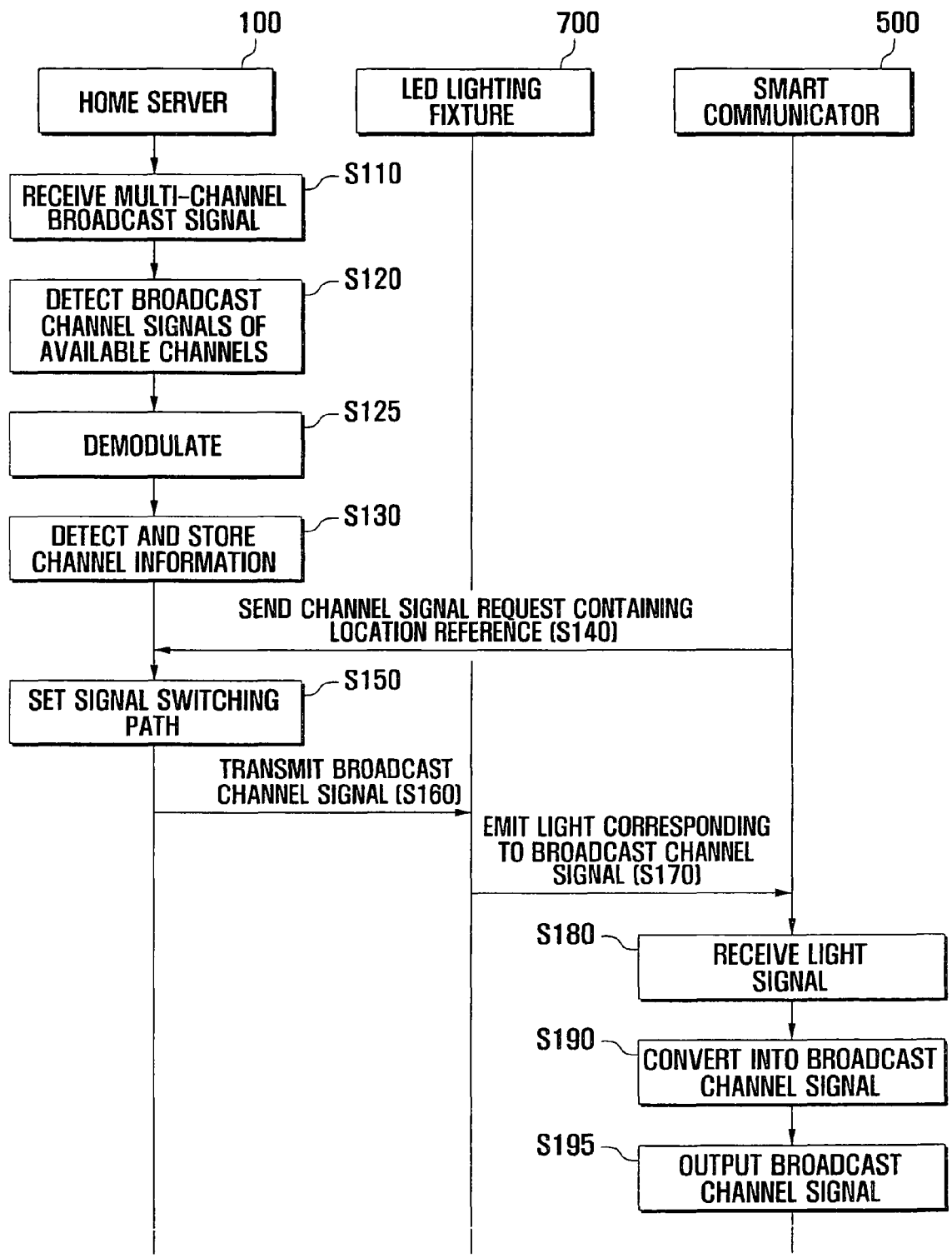
FIG. 5 is a flow diagram showing a broadcast signal retransmission method using illuminating visible-light communication according to another embodiment of the present invention.

FIG. 5 is a flow diagram showing a broadcast signal retransmission method using illuminating visible-light communication according to another embodiment of the present invention. As shown in FIG. 5, the method comprises the following steps.

Firstly, the RF coupler 105 of the home server 100 outputs a multi-channel broadcast signal received by the antenna to the individual RF tuners 110 in step S110.

According to an input command, the RF tuners 110 tune to the multi-channel broadcast signal from the RF coupler 105 to detect broadcast channel signals of available channels, and output the detected broadcast channel signals to the corresponding demodulators 120 in step S120.

Each of the demodulators 120 demodulates the broadcast channel signal outputted from the corresponding RF tuner 110, and outputs the demodulated broadcast channel signal in step S125. The channel information detector 160 detects channel information from the demodulated broadcast channel signals and stores the detected channel information in step S130.

In response to a user command, a smart communicator 500 sends a channel signal request message containing a desired channel index and location reference to the home server 100 in step S140. The path controller 180 of the home server 100 sets a signal switching path to route a broadcast channel signal of the requested channel based on the location reference in step S150.

To transmit the requested broadcast channel signal, the home server 100 superimposes, using the power line modem 150, the broadcast channel signal from the signal switching path on a power wave carried on a power line leading to the LED lighting fixture 700 installed at the site indicated by the location reference in step S160. The LED lighting fixture 700 outputs a light signal corresponding to the broadcast channel signal from the home server 100 in step S170.

The smart communicator 500 receives the light signal from the LED lighting fixture 700 in step S180, decodes the received light signal into a broadcast channel signal in step S190, and outputs the decoded broadcast channel signal as the requested broadcast channel signal in step S195.

Accordingly, when a user at a site in the home sends a channel signal request message to the home server 100, the home server 100 transmits a requested broadcast channel signal to the user. Therefore, the user can selectively receive a desired broadcast channel signal at any site in the home.

As apparent from the above description, the present invention provides a broadcast signal retransmission system and method wherein broadcast channel signals extracted from a received multi-channel broadcast signal can be routed along different signal paths so that, in reply to a channel signal request from a particular site, a selected broadcast channel signal is switched between the signal paths and transmitted via a power line leading to an LED lighting fixture installed at the particular site, and outputted through the LED lighting fixture. As a result, the user at a current location can selectively receive a desired broadcast channel signal through a nearby LED lighting fixture.

The present invention is disclosed in the preferred embodiments shown in this specification and in the accompanying drawings. This disclosure is not intended to limit the scope of the invention, but to serve only for illustrative purposes. It should be understood to the ordinary person skilled in the art that various changes or modifications of the embodiments are possible without departing from the spirit of the invention.

What is claimed is:

1. A broadcast signal retransmission system using illuminating light communication, comprising:
   one or more visible-light-emitting diode (LED) lighting fixtures, each comprising LEDs providing area illumination, each of the lighting fixtures of which converts a broadcast channel signal received through a power line into a light signal and outputs the converted light signal as illumination light;

a home server, including a radio frequency (RF) receiver;

one or more smart communicators, each of which includes an RF transmitter, and each of which performs a request message transmit operation for a desired broadcast channel by generating a channel request message and by sending the channel request message that includes a location reference in an RF signal to the home server, and decodes the illumination light from a corresponding LED lighting fixture into a reply broadcast signal and outputs the reply broadcast signal; and wherein the home server receives the RF signal, including the channel request message, from a particular smart communicator through the RF receiver, the home server for:

receiving a multi-channel broadcast signal, and upon reception of the channel request message containing a desired broadcast channel information and the location reference from the particular smart communicator, setting a signal switching path on the basis of the location reference; and transmitting the broadcast channel signal associated with the desired broadcast channel information through the signal switching path on a power wave carried on the power line leading to the LED lighting fixture installed at the site indicated by the location reference.

2. The broadcast signal retransmission system of claim 1, wherein the smart communicator comprises:

a communication module, including the RF transmitter, for connecting to the home server using an RF communication channel, to perform the channel request message transmit operation;

a light-receiving section for receiving the illumination light from a corresponding LED lighting fixture;

a broadcast signal decoder for decoding the illumination light into the reply broadcast signal; and a user interface for outputting the reply broadcast signal.

3. The broadcast signal retransmission system of claim 2, wherein the user interface includes at least one of a display section for displaying a video part of the reply broadcast signal and an audio processor for outputting an audio part of the reply broadcast signal.

4. The broadcast signal retransmission system of claim 2, wherein the smart communicator further comprises a key interface for inputting the channel request message containing the location reference.

5. The broadcast signal retransmission system of claim 2, wherein the smart communicator further comprises a memory section for storing the reply broadcast signal transmitted from the home server and the desired broadcast channel information of the reply broadcast signal.

6. The broadcast signal retransmission system of claim 1, wherein the home server comprises:

a communication module, including the RF receiver, for receiving the RF signal from the one or more smart communicators;

a radio frequency (RF) coupler for outputting the multi-channel broadcast signal to one or more output lines;

one or more RF tuners, each of which tunes to the multi-channel broadcast signal from the RF coupler to detect the broadcast channel signal of an available channel according to an input command;

one or more demodulators for demodulating the broadcast channel signals from the related RF tuners;

a switching section for:

setting the signal switching path on the basis of the location reference to route the broadcast channel signal associated with the desired broadcast channel information;

a power line modem for superimposing the broadcast channel signal on the power wave carded on the power line to transmit the broadcast channel signal through the power line.

7. The broadcast signal retransmission system of claim 6, wherein the home server further comprises:

a channel information detector for detecting channel information from the broadcast channel signals; and a path controller for controlling the switching section using the desired broadcast channel information.

8. The broadcast signal retransmission system of claim 1, wherein the home server is located in a facility; and wherein the one or more smart communicators is portable outside of the facility.

9. The broadcast signal retransmission system of claim 1, wherein the one or more smart communicators, using the RF transmitter, supports wireless broadband (WiBro) communications with the RF receiver of the home server.

10. A broadcast signal retransmission method using illuminating visible-light communication comprising one or more visible-light-emitting diode (LED) lighting fixtures, each comprising LEDs providing area illumination, each of the LED lighting fixtures of which converts a demodulated broadcast channel signal received through a power line into a light signal and outputs the converted light signal as illumination light, the method comprising the steps of:

transmitting a channel request message using one of a plurality of smart communicators, wherein each of which includes an RF transmitter, and each of which performs a request message transmit operation for a desired broadcast channel by generating the channel request message and sending the channel request message in an RF signal to a server;

receiving, at the server, a multi-channel broadcast signal through a radio frequency (RF) receiver, and demodulating the multi-channel broadcast signal into demodulated broadcast channel signals by available channels;

receiving, at the server, the RF signal, including the channel request message containing a desired broadcast channel information and a location reference from a particular smart communicator;

selecting, at the server, a power line path to a LED lighting fixture indicated by the location reference;

setting a signal switching path based on the location reference for routing a selected one of the demodulated broadcast channel signals;

superimposing the selected demodulated broadcast channel signal on a power wave carried on the power line connected to the signal switching path, and transmitting the selected demodulated broadcast channel signal through the power line to the LED lighting fixture installed at the site indicated by the location reference to output the converted light signal as illumination light; and receiving, by the smart communicator, the illumination light, decoding the received illumination light into a reply broadcast signal, and outputting the reply broadcast signal.

11. The broadcast signal retransmission method of claim 10, further comprising the step of:

detecting channel information from the demodulated broadcast channel signals, by the server, wherein the signal switching path is set through identifying the desired broadcast channel information and detecting the selected demodulated broadcast channel signal associated with the desired broadcast channel information, using the detected channel information.

12. The broadcast signal retransmission method of claim 10, wherein the step of receiving a multi-channel broadcast signal includes the steps of:
receiving the multi-channel broadcast signal and outputting the multi-channel broadcast signal to one or more output lines;
tuning to the multi-channel broadcast signal to detect the broadcast channel signals of the available channels; and
demodulating the broadcast channel signals.

13. The broadcast signal retransmission method of claim 10, further comprising the steps of:
disposing the server in a facility;
wherein the step of receiving includes the step of:
receiving the RF signal from the smart communicator located outside of the facility.

14. The broadcast signal retransmission method of claim 10, wherein the step of receiving includes the step of:
performing wireless broadband (WiBro) communications between the RF transmitter of the smart communicator, and the RF receiver of the server.

15. A broadcast communication signal retransmission system, comprising:
a server comprising:
means for receiving a multi-channel broadcast signal, and demodulating the multi-channel broadcast signal into broadcast channel signals by available channels;
radio frequency receiving means for receiving an RF signal, including a channel request message containing a desired broadcast channel information and a location reference: from a smart communicator having an RF transmitter;
means for setting a signal switching path on the basis of the location reference to route the broadcast channel signal associated with the desired broadcast channel information;
means for superimposing the broadcast channel signal associated with the desired broadcast channel information on a power wave carried on a power line; and
means for transmitting the broadcast channel signal through the signal switching path on the power wave carried on the power line leading to an LED lighting fixture installed at the site indicated by the location reference;
at least one visible-light-emitting diode (LED) lighting fixture, wherein each LED lighting fixture is for providing area illumination and for converting the broadcast channel signal received through the power line into a light signal and outputs the converted light signal as illumination light; and
wherein the smart communicator performs a request message transmit operation for a desired broadcast channel by generating the channel request message and by sending the channel request message including the location reference in the RF signal to the server, and decodes the illumination light from a corresponding LED lighting fixture into a reply broadcast signal and outputs the reply broadcast signal.

16. The broadcast signal retransmission system of claim 15, the server further comprising:
means for detecting channel information from the broadcast channel signals, by the server, wherein the signal switching path is set through identifying the desired broadcast channel information and detecting the broadcast channel signal associated with the desired broadcast channel information, using the detected channel information.

17. The broadcast signal retransmission system of claim 15, wherein the server further comprising:
means for tuning to the multi-channel broadcast signal to detect the broadcast channel signals of the available channels; and
means for demodulating the broadcast channel signals.

18. The broadcast signal retransmission system of claim 15, wherein the server further comprising:
storage means for storing the signal switching paths.

19. The broadcast signal retransmission system of claim 15, wherein the server is located in a facility and uses the RF receiving means for communicating with the RF transmitter of the smart communicator located outside the facility.

* * * * *